(12) United States Patent
Hayashi et al.

(10) Patent No.: US 11,213,011 B2
(45) Date of Patent: Jan. 4, 2022

(54) MASSAGING TOOL FOR PETS

(71) Applicant: DoggyMan H. A. Co., Ltd., Osaka (JP)

(72) Inventors: Akio Hayashi, Osaka (JP); Tomoya Sumitsuji, Osaka (JP)

(73) Assignee: DOGGYMAN H. A. CO., LTD., Osaka (JP)

( * ) Notice: Subject to any disclaimer, the term of this patent is extended or adjusted under 35 U.S.C. 154(b) by 501 days.

(21) Appl. No.: 16/181,527

(22) Filed: Nov. 6, 2018

(65) Prior Publication Data
US 2019/0387712 A1 Dec. 26, 2019

(30) Foreign Application Priority Data

Jun. 25, 2018 (JP) .............................. JP2018-119850

(51) Int. Cl.
*A01K 13/00* (2006.01)
*A61H 15/00* (2006.01)

(52) U.S. Cl.
CPC ......... *A01K 13/00* (2013.01); *A61H 15/0092* (2013.01); *A61H 2015/0014* (2013.01); *A61H 2201/1253* (2013.01); *A61H 2203/03* (2013.01)

(58) Field of Classification Search
CPC ........ A01K 13/00–002; A61H 15/0092; A61H 2015/0014; A61H 2201/1253; A61H 2203/03; A61H 2201/0153; A61H 2201/1695; A61H 2015/0042; A61H 2015/0064; A61H 2201/0157; A61H 2201/1671; A61H 2015/0007–0057; A61H 15/0085
See application file for complete search history.

(56) References Cited

U.S. PATENT DOCUMENTS

| | | | | |
|---|---|---|---|---|
| 1,086,936 A | * | 2/1914 | Pounder | .................. 601/141 |
| 1,915,190 A | * | 6/1933 | Koment | .................. A61H 23/02 601/107 |
| 2,011,471 A | * | 8/1935 | Casagrande | ....... A61H 15/0092 601/129 |
| 2,691,978 A | * | 10/1954 | Kirby | .................. A61H 15/0092 601/129 |
| 5,218,955 A | * | 6/1993 | Gueret | ............... A61H 15/0092 601/123 |
| D477,406 S | * | 7/2003 | Schroer | ........................ D24/143 |
| 7,377,001 B2 | * | 5/2008 | McKay | ............... A01K 13/002 15/176.6 |

(Continued)

FOREIGN PATENT DOCUMENTS

JP 2014-54310 A 3/2014

*Primary Examiner* — Justine R Yu
*Assistant Examiner* — Matthew D Ziegler
(74) *Attorney, Agent, or Firm* — Westerman, Hattori, Daniels & Adrian, LLP (57) ABSTRACT

Provided is a massaging tool for pets usable for pets of various sizes and various portions of pets, and having excellent maintenance property. A massaging tool for pets, which comprises two approximately cylindrical roller bodies, and a grip body having a branched supporting part which has a first and second supporting parts in the form of right and left pair, and can vary separation distance therebetween, wherein each of the first and the second supporting part supports the roller body in the freely rotatable manner so that a rotation axis of the roller body is oriented in the direction approximately vertical to the direction of the separation distance.

10 Claims, 8 Drawing Sheets

(56) References Cited

U.S. PATENT DOCUMENTS

| | | | | |
|---|---|---|---|---|
| 7,399,287 | B2* | 7/2008 | Meisch | A61H 7/005 |
| | | | | 601/136 |
| 7,819,828 | B2* | 10/2010 | Anderson | A61H 7/006 |
| | | | | 601/118 |
| 7,998,097 | B2* | 8/2011 | Gueret | A61H 15/02 |
| | | | | 601/123 |
| 10,206,848 | B2* | 2/2019 | Matsushita | A61N 1/26 |
| 2007/0083135 | A1* | 4/2007 | Gueret | A61H 15/00 |
| | | | | 601/127 |
| 2010/0049106 | A1* | 2/2010 | Gueret | A45D 34/041 |
| | | | | 601/112 |
| 2015/0005683 | A1* | 1/2015 | Balducci | A61H 15/00 |
| | | | | 601/134 |
| 2016/0310352 | A1* | 10/2016 | Chen | A61H 15/02 |
| 2017/0143583 | A1* | 5/2017 | Lin | A61H 15/0092 |
| 2019/0125623 | A1* | 5/2019 | Spratt | A61H 15/0092 |

* cited by examiner

MASSAGING TOOL FOR PETS

FIELD OF THE INVENTION

The present invention relates to a massaging tool for pets which can massage various portions of pets.

BACKGROUND ART

Generally, an owner and a pet have personal contact mainly by various physical contacts and saying, and good trusting relationship between the owner and the pet can be made by such a personal contact. Particularly in the personal contacts, other than the physical contacts, it is also possible to relax the pet by massaging the body of the pet to promote blood circulation and to heal stiffness.

There are many cases where the massage is conducted by directly touching with human hands. Recently, however, a massaging tool for pets has been proposed at a partial market, and effective massage can be achieved (for example, see Patent Literature 1).

Further, there is a case where a massaging tool for human is diverted to massaging for pets. From this viewpoint, in the present society, the distance between the human and the pet becomes further closer, and it seems that the intimate communication between the human and the pet will be continued in the future.

PRIOR ARTS

Patent Literature

Patent Literature 1: Japanese Patent Laid-Open Application 2014-54310

SUMMARY OF THE INVENTION

Problems to be Solved by the Invention

The massaging tool for pets of the Patent Literature 1 is so constructed that two rollers are supported by a grip which fits a user's hand, and when contacting physically by stroking with the massaging tool, the rollers act for massaging the body of the pet. However, since a separation distance between the two rollers is fixed, it is difficult to use the massaging tool over every body part of the pet. Further, when the rollers become dirt, since the massaging too does not have mechanism for easy changing and maintaining operation, it is necessary to improve the tool in order to specify only for pets.

The aspect of the present invention is to solve the above problems and to provide a massaging tool for pets which is usable for pets of various sizes and various portions of pets, and has excellent maintenance property.

Means for Solving the Problems

In order to solve the above problems, the present invention can provide a massaging tool for pets, which comprises:
two approximately cylindrical roller bodies, and
a grip body having a branched supporting part which has a first supporting part and a second supporting part which are in the form of a right and left pair, and can vary a separation distance between the first supporting part and the second supporting part,
wherein each of the first supporting part and the second supporting part supports the roller body in the freely rotatable manner so that a rotation axis of the roller body is oriented in the direction approximately vertical to the direction of the separation distance between the first supporting part and the second supporting part.

In the massaging tool for pets according to the present invention, it is desirable that
a variable range of the separation distance between the first supporting part and the second supporting part is in the range of 140 mm to 290 mm.

Here, the "separation distance" in the present invention is defined as the "minimum separation distance" at the steady state, and, when the first supporting part and the second supporting part are opened fully, is defined as the "maximum separation distance". Accordingly, the "variable range of the separation distance" is represented by a difference of the "maximum separation distance" and the "minimum separation distance". According to the massaging tool for pets of the present invention, by varying the separation distance between the first supporting part and the second supporting part, it is possible to use for pets having various sizes, and further to use over various parts such as face, shoulder, trunk body, lumbar, arm, and leg. Further, since the variation of the separation distance between the two roller bodies is caused by elastic deformation of the grip body, a force to back to the steady state (restoring force) is always generated, and the body of the pet can be properly clamped by the two roller bodies to assist the massaging force.

In the massaging tool for pets according to the present invention, it is desirable that
the roller body has a plurality of convex parts which project to the radial direction, and
the height of the convex parts is within the range of 3 mm to 9 mm.

According to the massaging tool for pets of the present invention having the above construction, even if the pet to be massaged is a long-haired pet, since the convex parts reach near the skin to give a proper abrasion and pressure thereto, it is possible to heal stiffness and to promote blood circulation.

In the massaging tool for pets according to the present invention, it is desirable that
the convex parts are formed on a surface of a ring-like cover belt which is detachable to the roller body.

According to the massaging tool for pets of the present invention having the above construction, since the roller bodies can be connected to the grip body in the simple construction and easy procedures, the roller bodies can be dismantled easily in the similar manner. Namely, since it is possible to do maintenances such as changing and washing of the roller body easily, it is possible to deal with adhesion of hair of pets and generation of dirties and the like.

In the massaging tool for pets according to the present invention, it is desirable that
the convex parts are made of a thermoplastic elastomer.

According to the massaging tool for pets of the present invention having the above construction, it is possible to apply a proper elastic force to the convex parts, and the skin is pressured sufficiently without injuring the skin of the pet.

Effects of the Invention

According to the present invention, it is possible to provide a massaging too for pets which is usable for pets of various sizes and various portions of pets, and has excellent maintenance property.

BRIEF EXPLANATION OF DRAWINGS

FIGS. 2(a)-2(b) show the construction of the grip body 5 shown in FIG. 1.

FIGS. 3(a)-3(c) show the construction of the core body 17 which constructs the roller body 3 shown in FIG. 1.

FIGS. 4(a)-4(c) show the construction of the lid 29 which constructs the roller body 3 shown in FIG. 1.

FIGS. 5(a)-5(b) show the construction of the cover belt 9 which constructs the roller body 3 shown in FIG. 1.

FIGS. 8(a)-8(b) show the construction of the roller body 103 having the other shape.

PREFERRED EMBODIMENTS

In the following, the massaging tool for pets according to the typical embodiment of the present invention is explained in detail by referring the drawings. However, the present invention is not limited to these drawings, and because the drawings are used to explain the concept of the present invention, as occasion demand, there is a case where the ratio and number of the parts may be exaggerated or simplified for the sake of easy understanding. Further, in the following, there are cases that the same symbols may be applied to the same or corresponding parts, and overlapped explanation may be omitted.

1. Summary of the Massaging Tool 1 for Pets

Figure 1:
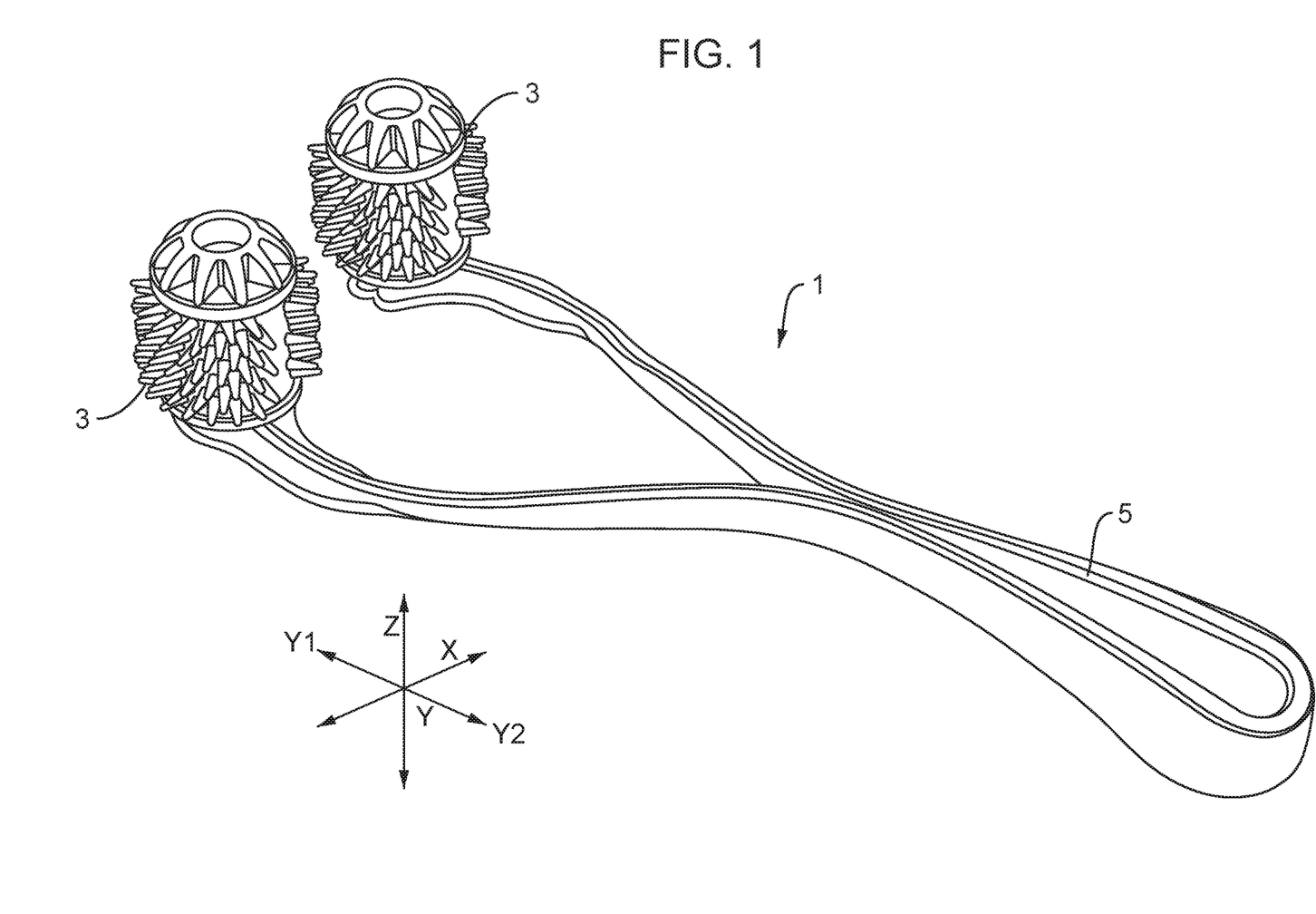
FIG. 1 is a schematic view showing the massaging tool 1 for pets according to the present embodiment.

By referring to FIG. 1, the summary of a massaging tool 1 for pets according to the present embodiment is explained. FIG. 1 is a schematic view showing the summary of the massaging tool 1 for pets according to the present embodiment. The massaging tool 1 of the present embodiment is a massaging tool to be used mainly for pets such as dogs and cats, and can promote total blood circulation and establish suitable communication with the pets.

In the massaging tool 1 for pets of the present embodiment, for the sake of easy understanding, the direction X indicates the width direction, the direction Y indicates the longitudinal direction, and the direction Z indicates the height direction. Further, in the longitudinal direction Y, for the sake of detailed explanation, the direction Y1 indicates the top-end direction, and the direction Y2 indicates the rear-end direction.

2. Construction of the Massaging Tool 1 for Pets

As shown in FIG. 1, the massaging tool 1 for pets is provided with two approximately cylindrical roller bodies 3, and a grip body 5 having a branched supporting part 7 which has a first supporting part 7A and a second supporting part 7B which are in the form of a right and left pair, and can vary a separation distance between the first supporting part 7A and the second supporting part 7B, wherein each of the first supporting part 7A and the second supporting part 7B supports the roller body 3 in the freely rotatable manner so that a rotation axis 13 of the roller body is oriented in the direction (direction Z) approximately vertical to the direction (direction X) of the separation distance between the first supporting part 7A and the second supporting part 7B.

The massaging tool 1 for pets has the two approximately cylindrical roller bodies 3 which can rotate when being directly contact with the body of the pet, the grip body 5 which supports the two roller bodies 3. The roller body 3 is constructed by two or more parts, and the detailed construction of the roller body 3 is explained below.

<Construction of the Grip Body 5>

Figure 2:
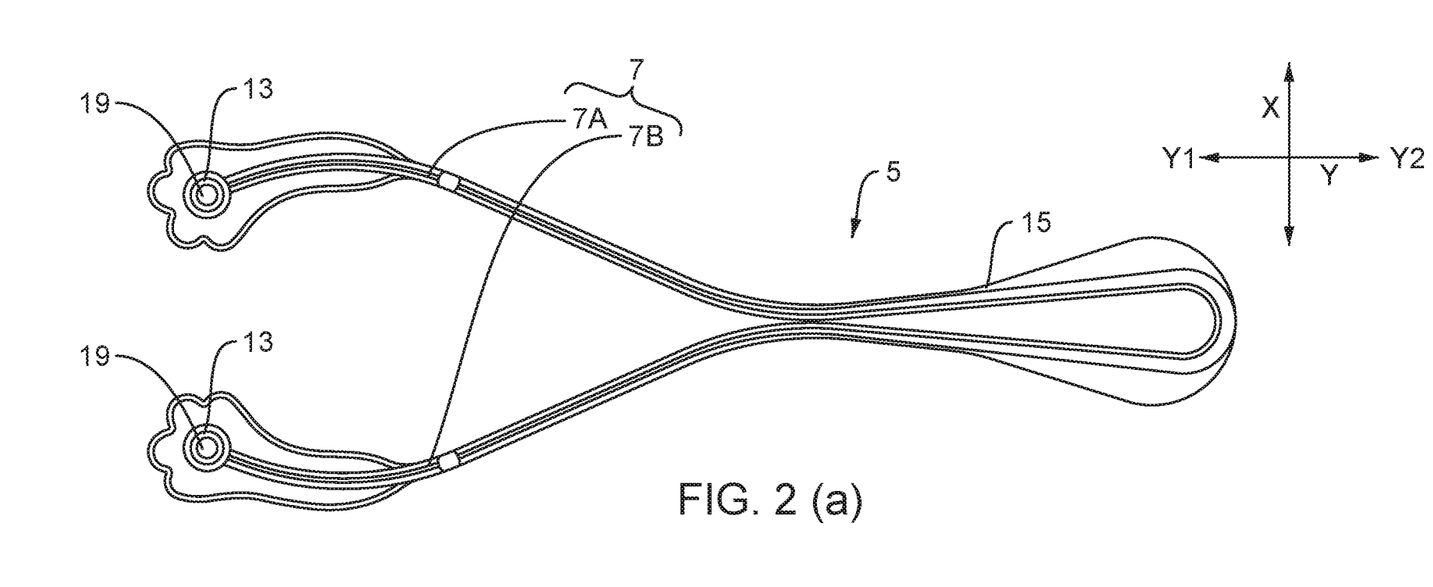
FIG. 2(a) is a plan view of the grip body 5.
FIG. 2(b) is a side view of the grip body 5 from the second supporting part 7B side.

Next, the detailed construction of the grip body 5 is explained by referring FIG. 2. FIGS. 2(a) and (b) show the construction of the grip body 5, and FIG. 2(a) is a plan view of the grip body 5, and FIG. 2(b) is a side view of the grip body 5 from the second supporting part 7B side. The grip body 5 according to the present embodiment has approximately Y-shaped body, and is a part for operating the massaging tool by gripping the grip body while supporting the two roller bodies 3 mentioned below in the freely rotatable manner.

As shown in FIGS. 2(a) and (b), the grip body 5 is constructed by forming the branched supporting part 7 composed of the first supporting part 7A and the second supporting part 7B in the direction Y1, and in the direction Y2, forming a grip part 15 which is griped by a user to operate the massaging tool for pets. The branched supporting part 7 has a branched point at a predetermined position in front of the grip part 15, the first supporting part 7A and the second supporting part 7B are elongated from the branched point in the direction Y1 so as to separate the tops from each other in the direction X.

Each of the first supporting part 7A and the second supporting part 7B has the rotation axis 13 which projects to the upper side in the direction Z (the direction approximately vertical to the direction of the separation distance between the first supporting part 7A and the second supporting part 7B). Further, at the top side of the rotation axis 13, an engaging part 19 which engages with an engaging cap 21 explained below is formed in the coaxial manner to the rotation axis 13.

The diameter of the rotation axis and the diameter of the engaging part 19 are different from each other, and the diameter of the engaging part 19 is smaller than the diameter of the rotation axis 13. The sizes in the radial direction and the lengths in the direction Z of the rotation axis 13 and the engaging part 19 are properly determined mainly according to the size of the roller body 3.

In the present embodiment, as mentioned above, the roller body 3 can be supported by forming the rotation axis 13 and the engaging part 19, but the construction is not limited thereto. Even if the roller body 3 can be supported in the freely rotatable manner as in the present embodiment, any construction may be employed.

It is desirable that the sizes such as thickness and length of the grip part 15 may be determined within the range where a general adult can grip and operate the massaging tool 1 for pets freely. The grip body 5 of the present embodiment is so constructed that a long approximately rod-like member made of a resin material having a proper elasticity is bended at two or more points.

The separation distance between the first supporting part 7A and the second supporting part 7B in the direction X can be varied by elastic deformation of the branched supporting part 7 (elastic deformation of the whole of the grip body 5). Since the variation of the separation distance between the first supporting part 7A and the second supporting part 7B is defined by the size of the roller body 3 to be used, the detailed explanation is done in the following explanation as to the support of the roller body 3 by the branched supporting part 7.

<Construction of the Roller Body 3>

Figure 3:
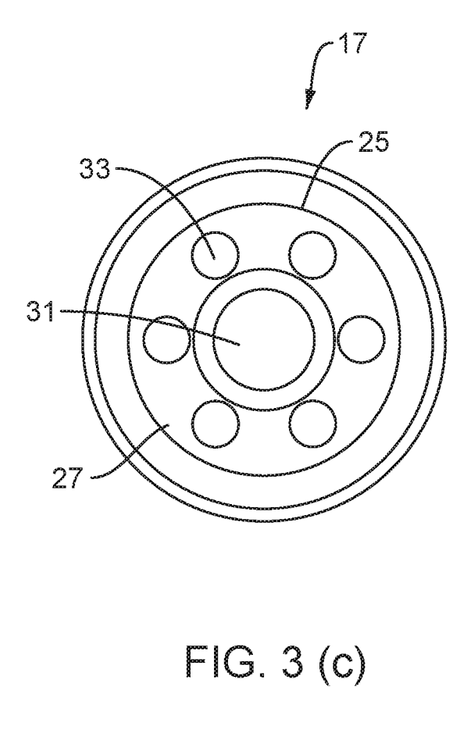
FIG. 3(a) is a bottom view of the core body 17.
FIG. 3(b) is a side view of the core body 17.
FIG. 3(c) is a plan view of the core body 17.
Figure 4:
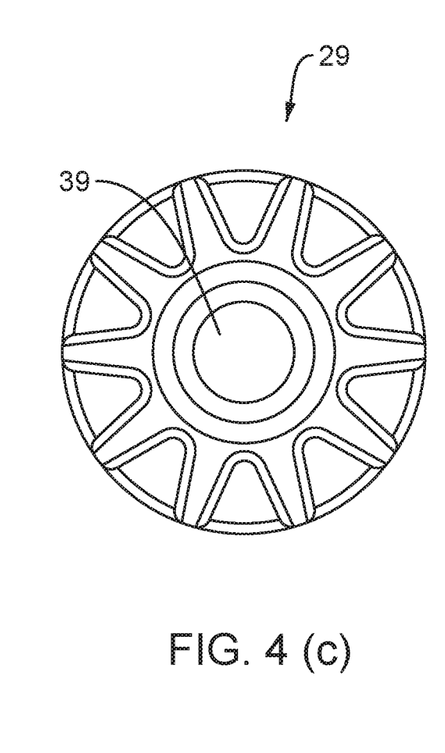
FIG. 4(a) is a bottom view of the lid 29.
FIG. 4(b) is a side view of the lid 29.
FIG. 4(c) is a plan view of the lid 29.
Figure 5:
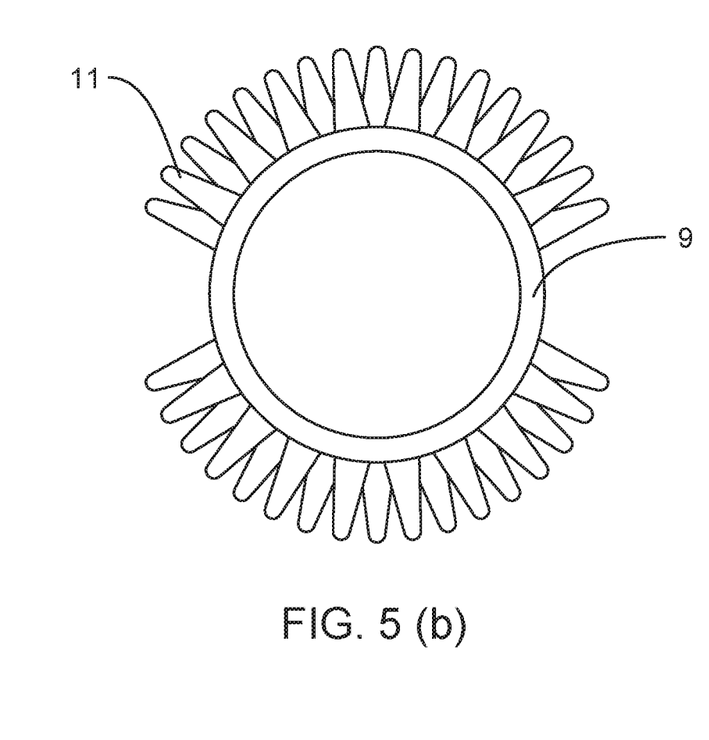
FIG. 5(a) is a side view of the cover belt 9.
FIG. 5(b) is a plan view of the cover belt 9.

Next, the detailed construction of the roller body 3 is explained by referring FIG. 3, FIG. 4, and FIG. 5. FIG. 3 shows the construction of a core body 17 which constructs the roller body 3, and FIG. 3(*a*) is a bottom view of the core body 17, FIG. 3(*b*) is a side view of the core body 17, and FIG. 3(*c*) is a plan view of the core body 17. FIG. 4 shows the construction of a lid 29 which constructs the roller body 3, and FIG. 4(*a*) is a bottom view of the lid 29, FIG. 4(*b*) is a side view of the lid 29, and FIG. 4(*c*) is a plan view of the lid 29. Further, FIG. 5 shows the construction of a cover belt 9 which constructs the roller body 3, and FIG. 5(*a*) is a side view of the cover belt 9, and FIG. 5(*b*) is a plan view of the cover belt 9.

The roller body 3 is generally constructed by the three parts such as the core body 17, the lid 29 and the cover belt 9. As shown in FIG. 3, the core body 17 is a part that is made of a resin material and has approximately cylindrical shape. Specifically, the core body 17 has a top surface 27 and a bottom surface 23 which are provided at the both ends of the core body in the longitudinal direction in the approximately parallel manner, and a side surface 25, and further has a center hole 31 which is elongated in the longitudinal direction at the center of the radial direction.

On the outer peripheral of the top surface 27, there are provided a plurality of engaging holes 33 which are elongated in the longitudinal direction along the peripheral of the center hole 31. By inserting a convex part 35 of the lid 29 mentioned below into the engaging hole 33, the core body 17 can be connected to the lid 29.

As shown in FIG. 4, the lid 29 is made of a resin or the like in the flat shape and is a part for connecting to the core body 17, and for fixing the cover belt 9 mentioned below in such a manner that the side surface 25 of the core body 17 is covered with the cover belt. In the more detailed construction, the lid 29 has an engaging surface 37 which corresponds to the top surface 27 of the core body 17, and a plurality of projections 35 which are arranged in the direction approximately vertical to the engaging surface 37, and an axis hole 39 which passes through from the center of the engaging surface 37 to the opposite side.

It is desirable that the area of the engaging surface 37 is larger by a predetermined amount than the area of the top surface 27 of the core body 17, and that the axis hole 39 has approximately the same diameter as that of the center hole 31 of the core body 17. Further, as to the size of the projection 35, it is desirable to determine the size such that, when inserting the projection into the engaging hole 33 of the core body 17, a given friction resistance is caused to engage with each other. Also, when lid 29 and the core body 17 are connected, the axis hole 39 of the lid 29 is in the coaxial position with respect to the center hole 31 of the core body 17.

The cover belt 9 is a belt-like part which is made of a resin having excellent heat processability and proper elasticity such as a thermoplastic elastomer (TPE), and is formed into approximately ring-like (approximately cylindrical) shape, and, as shown in FIG. 5, a plurality of convex parts 11 projected to the radial direction are formed all over the side surface. It is desirable that the size of the cover belt 9 in the longitudinal direction is approximately the same as the size of side surface 25 of the core body 17 in the longitudinal direction, and the inner diameter of the cover belt 9 is approximately the same as the diameter of the core body 17. The cover belt 9 can be detachably assembled to the core body 17 of the roller body 3.

A plurality of convex parts 11 is a moiety provided on the side surface of the cover belt 9, and it is desirable that the height thereof is within the range of 3 mm to 9 mm. By making the contact portion of the roller body 3 leaner, and forming the height of the convex part 11 within the above range, when massaging the pet by using the massaging tool 1 for pets, even if the pet to be massaged is a long-haired pet, the convex part 11 can reach near the skin, which gives a proper friction and pressure to give a relatively strong stimulation, which results in proper healing of stiffness and promotion of blood circulation. As a result of repeated examples, the present inventors have found that when the convex part 11 is high, the massaging tool is most preferable to a long-haired cat.

3. Assembling of the Massaging Tool 1 for Pets

Figure 6:
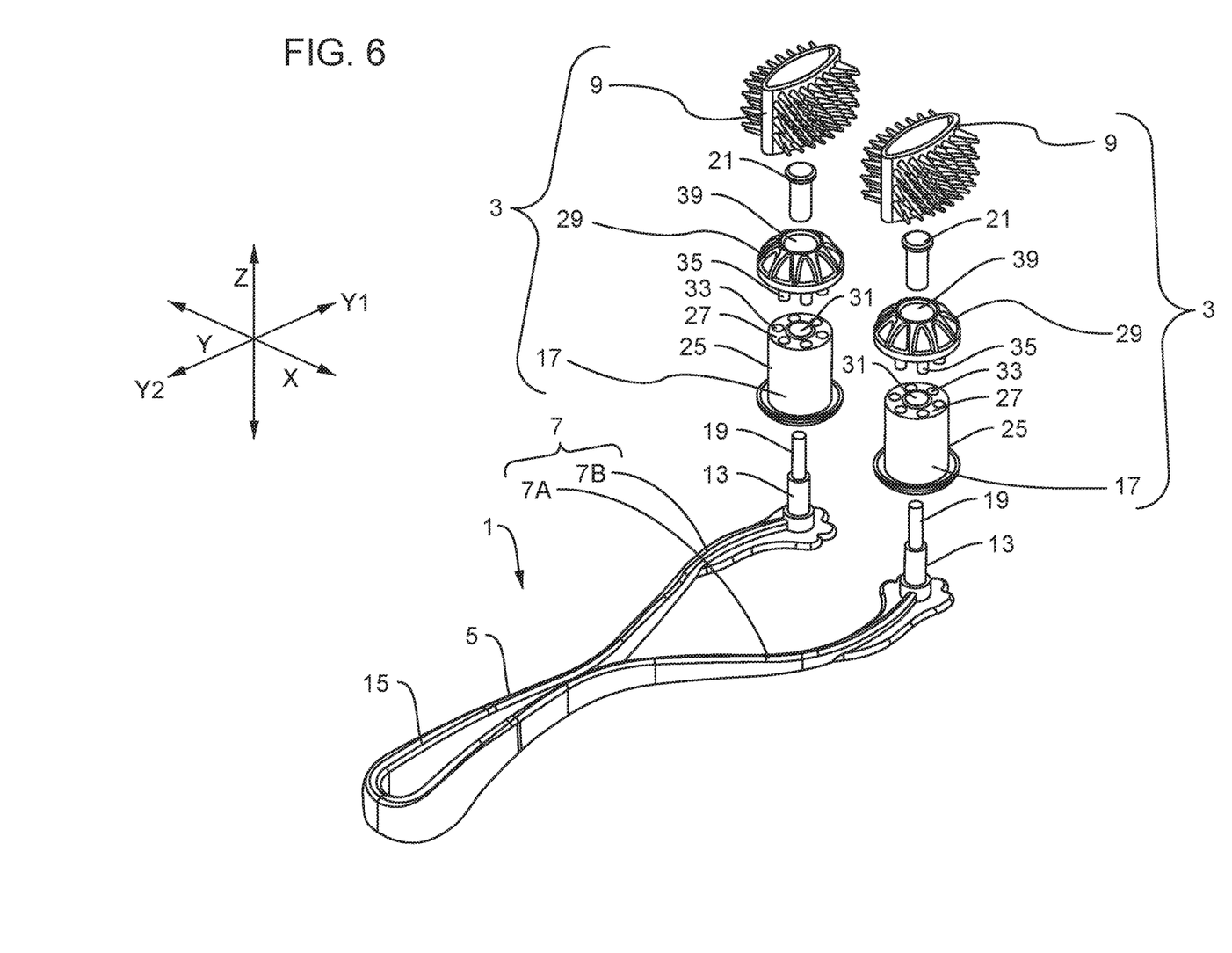
FIG. 6 is a schematic view showing the method of assembling the massaging tool 1 of the present embodiment.

Next, by referring FIG. 6, the method of assembling of the massaging tool 1 for pets is explained in detail. FIG. 6 is a schematic view showing the method of assembling the massaging tool 1 of the present embodiment. The massaging tool 1 of the present embodiment is constructed by connecting the roller bodies to the first supporting part 7A and second supporting part 7B of the grip body 5.

As shown in FIG. 6, while the core body 17, the lid 29 and the cover belt 9 are oriented in the axial direction, at first, the side surface 25 of the core body 17 is covered with the cover belt 9 from the top surface 27 side. Consequently, by closing the lid 29 to the core body 17 and inserting the projection 35 into the engaging hole 33, the lid 29 is connected to the core body 17 to prevent the cover belt from moving in the axial direction.

After the roller body 3 is assembled according to the above procedures, the roller body is engaged to the engaging part 19 by inserting the rotation axis 13 (engaging part 19) of the grip body 5 into the center hole 31 from the bottom surface 23 of the core body 17, and further inserting an engaging cap 21 into the axis hole 39 (center hole 31) from the lid 29 side.

Thereby, it is possible to support the roller body 3 in the freely rotatable manner at the top of the first supporting part 7A and the second supporting part 7B of the grip body 5 (the roller body 3 is supported in the freely rotatable manner so that the rotation axis 13 is oriented in the direction (direction Z) approximately vertical to the direction of the separation distance (direction X) between the first supporting part 7A and the second supporting part 7B). After these procedures are finished, the method for assembling the massaging tool 1 for pets of the present embodiment is completed.

Though the detailed construction is not shown by referring a drawing, the engaging cap 21 has a guard part at the one end, and is an approximately cylindrical part having an outer diameter which is smaller than the diameter of the center hole 31 of the core body 17 by a predetermined length. In the inside of the engaging cap, there are provided an opening at the other end and a hole where the engaging part 19 of the grip body 5 to engage.

As mentioned above, according to the massaging tool 1 of the present embodiment, since the roller body 3 can be connected to the grip body 5 due to the simple construction and easy way, dismantling procedures can also be achieved in the same easy way. Namely, since it is possible to do maintenances such as changing and washing of the roller body 3 easily, it is possible to clean adhered hair of pets and generated dirties, and the like. Due to these features, the massaging tool 1 for pets of the present embodiment is specified to the use for pets, which is different from the conventional massaging related tools for human.

4. Adapt to Various Portions of Pets

Figure 7:
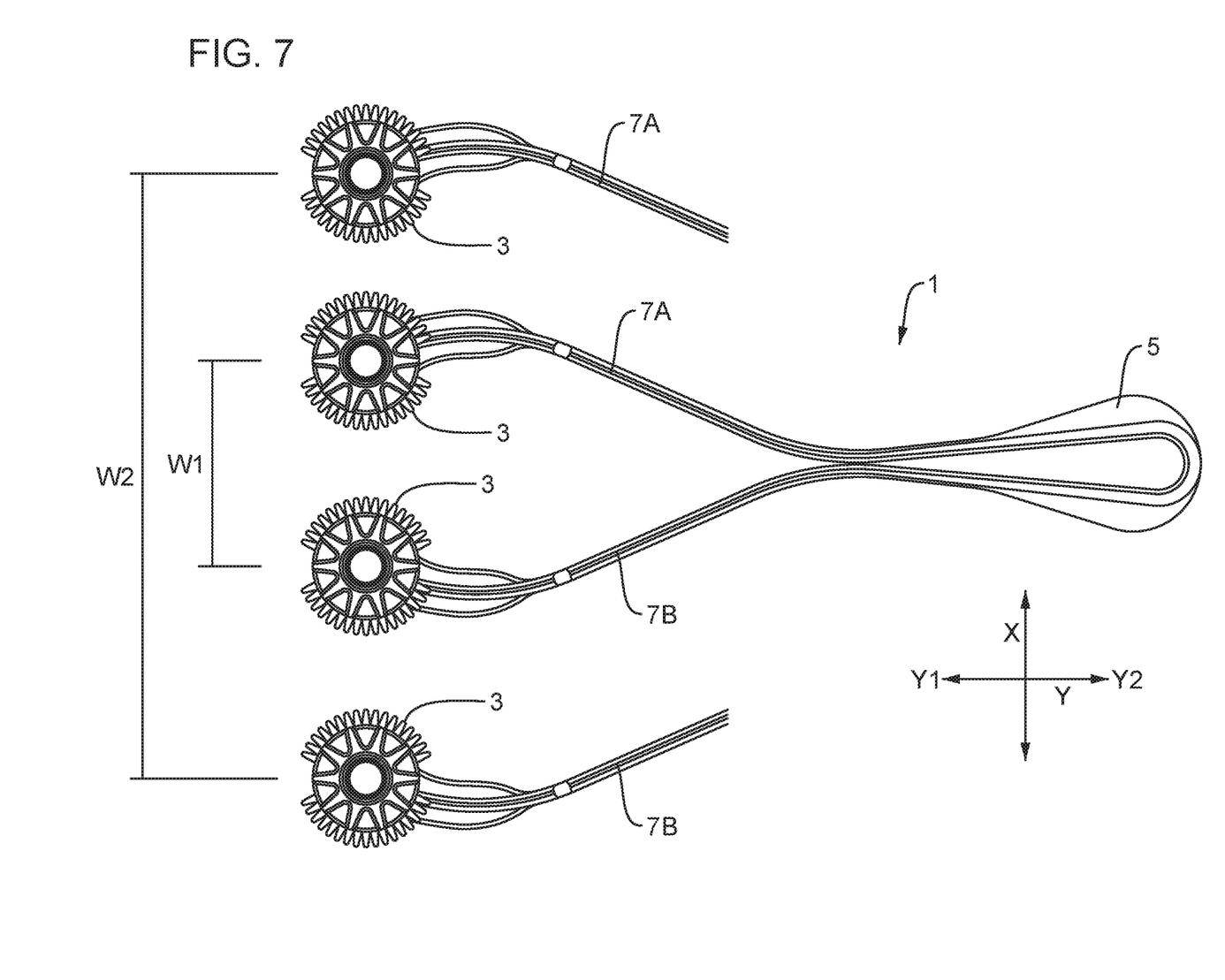
FIG. 7 is a schematic view showing the variation of the separation distance between the first supporting part 7A and the second supporting part 7B.

Next, the variation of the separation distance between the first supporting part 7A and the second supporting part 7B is explained in detail by referring FIG. 7. FIG. 7 is a schematic view showing the variation of the separation distance between the first supporting part 7A and the second supporting part 7B. According to the massaging tool 1 for pets of the present embodiment, the massage can be achieved corresponding to the various sizes of the body of the pet by varying the separation distance between the first supporting part 7A and the second supporting part 7B.

As shown in FIG. 7, according to the massaging tool 1 for pets, the separation distance between the first supporting part 7A and the second supporting part 7B of the branched supporting part 7 in the direction X (distance between the both rotation axes 13) can be varied by deforming elastically the grip body 5. The "separation distance" is the "minimum separation distance" at the steady state, and, when the first supporting part 7A and the second supporting part 7B are opened fully, is the "maximum separation distance". Usually, it is desirable to set the minimum separation distance W1, namely the distance between the roller bodies 3 (distance when the two roller bodies 3 are at the closest position) for 10 mm or more. It is desirable to set the maximum separation distance W2 for within the range of 150 mm to 300 mm. Accordingly, the variable separation distance (W) is a difference of the maximum separation distance W2 and the minimum separation distance W1 (i.e. W=W2−W1), and thus it is desirable to set the variable separation distance for within the range of 140 mm to 290 mm.

Thereby, it is possible to use for pets having various sizes, and further to use over various parts such as face, shoulder, trunk body, lumbar, arm, and leg. Further, since the variation of the separation distance between the two roller bodies 3 is caused by elastic deformation of the grip body 5, a force to back to the steady state (restoring force) is always generated, and the body of the pet can be properly clamped by the two roller bodies 3 to assist the massaging force.

In the above, the embodiments of the present invention are explained by referring the drawings, but the present invention is not limited thereto, and there are other improvements and modifications can be obtained without departing from the spirit and teaching. Those skilled in the art easily understand that those improvements and modifications are wholly included within the scope of the present invention.

5. Roller Body 103 Having the Other Shape

Figure 8:
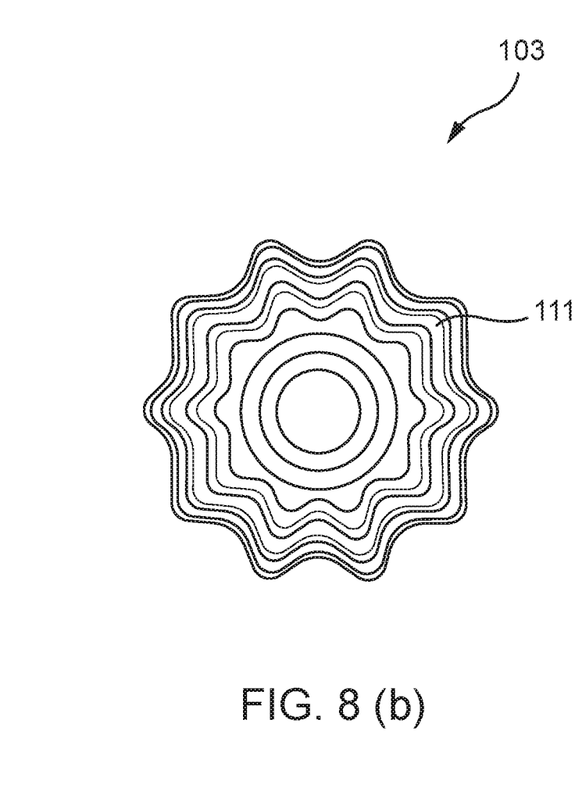
FIG. 8(a) is a side view of the roller body 103 having the other shape.
FIG. 8(b) is a plan view of the roller body 103 having the other shape.

According to the massaging tool 1 for pets of the present embodiment, by utilizing the easy connecting mechanism of the roller body 3 and the grip body 5, it may be possible to replace by a roller body 103 having the other shape shown in FIG. 8. FIG. 8 shows the construction of the roller body 103 having the other shape, and FIG. 8(a) is a side view of the roller body 103 having the other shape, and FIG. 8(b) is a plan view of the roller body 103 having the other shape.

As shown in FIGS. 8(a) and (b), the roller body 103 having the other shape has a plurality of convex parts 111 which project in the radial direction and have relatively gentle convex and concave parts. Further, as shown in FIG. 8(b), the top of the convex part has an angle of approximately 90 degrees and a round shape, and as shown in FIG. 8(a), the roller body 103 has a dome-like shape when seeing from the direction X in FIG. 7, and the contact part is inclined.

As a result of repeated examples, the present inventors have found that by using the roller body 103 having such features, a relatively short-haired pet such as dog which feels uncomfortable when using the convex part 11 of the roller body 3 because of strong stimulation is pleased, and the roller body having the other shape is suitable to such a short-haired pet, and can give a mild stimulation to the pets. Further, when using the roller body 3 and the roller body 103 while switching corresponding to the portions of pets, it is possible to improve the massaging effect more.

INDUSTRIAL APPLICABILITY

The massaging tool for pets of the present embodiment is usable for pets of various sizes and various portions of pets, and having excellent maintenance property.

EXPLANATION OF SYMBOLS

1 Massaging tool for pets
3 Roller body
5 Grip body
7 Branched supporting part
7A First supporting part
7B Second supporting part
9 Cover belt
11 Convex part
13 Rotation axis
15 Grip part
17 Core body
19 Engaging part
21 Engaging cap
23 Bottom surface
25 Side surface
27 Top surface
29 Lid
31 Center hole
33 Engaging hole
35 Projection
37 Engaging surface
39 Axis hole
103 Roller body 103
111 Convex part
W Variable separation distance
W1 Minimum separation distance
W2 Maximum separation distance

The invention claimed is:

1. A massaging tool for pets, which comprises:
a grip body having a branched supporting part which has a first supporting part and a second supporting part which are in the form of a right and left pair,
a first approximately cylindrical roller body and a second approximately cylindrical roller body that engage the first supporting part and the second supporting part, respectively,
a first cylindrical cover belt and a second cylindrical cover belt that are detachably mounted on the first approximately cylindrical roller body and the second approximately cylindrical roller body, respectively, and
a first assembly comprising a first lid and a first engaging cap, and a second assembly comprising a second lid and a second engaging cap, the first assembly and the second assembly engaging the first approximately cylindrical roller body and the second approximately cylindrical roller body, respectively, so as to hold the first and second cylindrical cover belts in position,
wherein:
the first supporting part and the second supporting part are elastically deformable, the first supporting part comprises a first flat portion and a first protrusion protruding perpendicularly from a flat surface of the first flat portion, the second supporting part comprises a second flat portion and a second protrusion protruding perpendicularly from a flat surface of the second flat portion, the flat surface of the first flat portion and flat surface of the second plat portion define a first plane, the first and second approximately cylindrical roller bodies are mounted on the first protrusion of the first supporting part and the second protrusion of the second supporting part, respectively, in a freely rotatable manner so that a rotation axis of each of the first and second approximately cylindrical roller bodies is in a second plane that is oriented perpendicularly to the first plane, the first protrusion comprises a first protrusion part and a second protrusion part that are continuous with each other, the second protrusion part having a smaller diameter than the first protrusion part, the second protrusion comprises a third protrusion part and a fourth protrusion part that are continuous with each other, the fourth protrusion part having a smaller diameter than the third protrusion part, a plurality of convex parts are formed on and project in a radial direction from a surface of each of the first and second cylindrical cover belts, and each of the first and second cylindrical cover belts is made of a resin having elasticity.

2. The massaging tool for pets according to claim 1, wherein:
the first supporting part and the second supporting part are elastically deformable in a direction parallel to the first plane to increase a separation distance between the first supporting part and the second supporting part to within the range of 140 mm to 290 mm.

3. The massaging tool for pets according to claim 2, wherein:
a height of each of the plurality of convex parts is within the range of 3 mm to 9 mm.

4. The massaging tool for pets according to claim 2, wherein:
the plurality of convex parts are made of a thermoplastic elastomer.

5. The massaging tool for pets according to claim 1, wherein:
a height of each of the plurality of convex parts is within the range of 3 mm to 9 mm.

6. The massaging tool for pets according to claim 5, wherein:
the plurality of convex parts are made of a thermoplastic elastomer.

7. The massaging tool for pets according to claim 1, wherein:
the plurality of convex parts are made of a thermoplastic elastomer.

8. The massaging tool for pets according to claim 1, wherein:
the first lid frictionally engages the first approximately cylindrical roller body, and the first engaging cap engages the second protrusion part of the first protrusion, and
the second lid frictionally engages the second approximately cylindrical roller body, and the second engaging cap engages the fourth protrusion part of the second protrusion.

9. The massage tool for pets according to claim 8, wherein:
the first lid comprises a plurality of first projections that are inserted into a plurality of first engaging holes in the first approximately cylindrical roller body, and
the second lid comprises a plurality of second projections that are inserted into a plurality of second engaging holes in the second approximately cylindrical roller body.

10. The massage tool for pets according to claim 1, wherein each of the first engaging cap and the second engaging cap is cylindrical.

* * * * *